United States Patent
Howard

[15] 3,689,505
[45] Sept. 5, 1972

[54] CRYSTALLINE PLICATIN

[72] Inventor: John Howard, Shelton, Wash.

[73] Assignee: International Telephone and Telegraph Corp., New York, N.Y.

[22] Filed: May 27, 1969

[21] Appl. No.: 828,378

[52] U.S. Cl..............................260/343.3, 260/999
[51] Int. Cl. ...............................................C07d 5/32
[58] Field of Search....................................260/343.3

[56] References Cited

OTHER PUBLICATIONS

Gardner et al. (I) Can. J. Chem. 37, 1,703– 1,704 (1959)
Gardner et al. (II) Can. J. Chem. 44, 52 (1966)
Swan et al. Can. J. Chem. 45, 319– 320 (1965)
Wagner et al. " Synthetic Organic Chemistry," New York, Wiley, 1953, page 533

Primary Examiner—Alex Mazel
Assistant Examiner—R. V. Rush
Attorney—C. Cornell Remsen, Jr., Walter J. Baum, Percy P. Lantzy, J. Warren Whitesel, Delbert P. Warner and James B. Raden

[57] ABSTRACT

A new composition of matter comprising the pure crystalline γ-lactone of plicatic acid (i.e., crystalline plicatin) is prepared. The new processes for preparing this crystalline plicatin comprise dissolving crystalline plicatic acid tetrahydrate in an excess of an inert, neutral solvent, heating the resulting solution and then rapidly cooling the solution whereupon pure crystalline plicatin is obtained. Acid catalysts in catalytic amounts may be incorporated into the plicatic acid-solvent solution.

7 Claims, No Drawings

CRYSTALLINE PLICATIN

This invention relates to new and improved compositions of matter and to methods for the preparation thereof. More particularly, it relates to pure crystalline plicatin and to methods for its preparation.

Plicatin is the γ-lactone of plicatic acid and has the following structure based upon the chemical degradation products, n.m.r. spectra, and X-ray crystallography data of the parent acid:

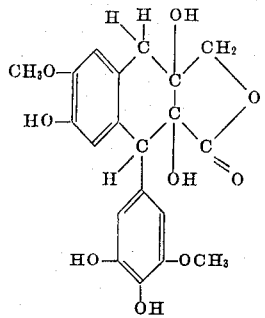

This composition was first described in a superficial manner by J. A. F. Gardner, G. M. Barton, and Harold MacLean [Can J. Chem. 37, 1703-9 (1959)] who disclosed that what appeared to be a γ-lactone of plicatic acid could be prepared by heating plicatic acid (or an aqueous solution thereof). No analytical data was given for this suspected γ-lactone of plicatic acid prepared in this manner. However, it is clear that the crude, dark colored amorphous product thus prepared had properties quite different from the pure crystalline product prepared by the present process. Reference to the optical rotary dispersion of the γ-lactone was made by R. J. Swan, W. Klyne and H. MacLean [Can J. Chem. 45, 319 (1967)] in a paper relating to the determination of the absolute configuration of plicatic acid. This paper made no mention of the preparation procedures, and the amorphous plicatin prepared was admittedly not pure.

Thus, the only previously known γ-lactone of plicatic acid (i.e., plicatin) which has been prepared and described in the literature has been an amorphous product, usually in a very crude form, quite different from the pure, light stable, crystalline product obtained by the present process.

The only previously known methods for preparing these amorphous plicatin products involved heating the solid plicatic acid or plicatic acid tetrahydrate en masse (e.g., as described in U.S. Pat. No. 3,502,702 issued to Howard), or in the form of a suspension in a solvent such as xylene. In heating the solid acid en masse, it was very difficult to obtain good heat transfer and, therefore, this process was quite inefficient. When a suspension of the acid was heated in the heretofore available solvents, the suspension required extremely vigorous stirring in order to prevent the sticky amorphous plicatin from forming large globules at the reflux temperature of the solvent.

Therefore, it is clear that these heretofore available processes for preparing the γ-lactone of plicatic acid are quite inefficient and would be economically disadvantageous from the standpoint of scaling-up for commercial preparation of this product. Additionally, it is to be noted that these previously outlined procedures do not yield a crystalline product.

The utility of the amorphous γ-lactone of plicatic acid (i.e., amorphous plicatin) has been described in several recent patent applications. For example, the amorphous lactone of plicatic acid (i.e., amorphous plicatin) has been described as an effective agent for the prevention and treatment of oxalate urolithiasis in the U.S. patent application of Zinsser, Ser. No. 41,704, filed May 26, 1970, which is a continuation of abandoned U.S. application Ser. No. 709,832, filed Mar. 1, 1968. Additionally, as described in the aforementioned U.S. Pat. No. 3,502,702, amorphous plicatin has been shown to be an important intermediary in the preparation of plicatenol, an anti-oxidant for fats and oils.

The crystalline plicatin of the present invention has advantages over the heretofore available amorphous product. Some of these advantages are that the crystalline plicatin prepared by the instant processes is very pure, colorless, quite stable to light and has no tendency to turn a purple color as does the amorphous plicatin. Additionally, by the process of the present invention crystalline plicatin can be prepared more economically, with greater reproducibility of results, and is more suitable for commercial production. Consequently, it is apparent that the crystalline plicatin of the present invention would have even greater utility for the above described uses which have been shown, heretofore, for plicatin. Also, crystalline plicatin is adaptable for other important uses.

Furthermore, crystalline plicatin has been shown to exhibit useful anti-oxidant activity in edible fats and oils.

It is, therefore, an object of the present invention to provide a new and improved composition of matter, namely the pure, crystalline γ-lactone of plicatic acid (i.e. crystalline plicatin).

Another object is to provide new and improved methods for preparing crystalline plicatin.

A further object is to provide economical and commercially advantageous processes for preparing crystalline plicatin.

A still further object is to provide a new and improved anti-oxidant compound, crystalline plicatin, having utility as an anti-oxidant for fats and oils. This new and improved compound has added utility as an intermediary in the production of other known anti-oxidants, and also as an intermediary for or as a constituent of pharmaceutical products.

Additional objects if not specifically set forth herein will be readily apparent to those skilled in the art from the following detailed description of the invention.

I have discovered that a new composition of matter, hereinafter referred to as crystalline plicatin, is produced by a simple and commercially advantageous process. More specifically, I have found that pure crystalline plicatin can be obtained from crystalline plicatic acid tetrahydrate which has been prepared by the process described in U.S. patent application of Howard, et al., Ser. No. 687,092, filed Dec. 1, 1967.

In a preferred embodiment of my invention, I have found that pure crystalline plicatin can be prepared by dissolving crystalline plicatic acid tetrahydrate in an excess of an inert, neutral solvent. The resulting solution of plicatic acid and inert, neutral solvent is then refluxed under anhydrous conditions to convert the plicatic acid to plicatin. The water of lactonization is removed azeotropically and the solution is rapidly cooled to ambient temperature or below. Any unreacted plicatic acid is filtered off. Pure, colorless plicatin then crystallizes out of the mother liquor and is recovered by conventional methods.

If desired, a catalytic amount of acid catalyst is incorporated into the solution of plicatic acid and inert, neutral solvent in the process of the invention. This introduction of acid catalyst expedites the conversion of the acid into its γ-lactone form (i.e., plicatic acid into plicatin). Acid catalysts such as p-toluene sulfonic acid and the like, have been found to be especially advantageous for this purpose. However, incorporation of the acid catalyst is optional. The plicatic acid tetrahydrate is converted into pure, crystalline plicatin by the process of the invention in the absence of a catalyst.

The selection of the proper solvent for use in the process of this invention is critical. It has been discovered that this solvent should be inert and neutral with respect to both the acid starting material and the lactone end product. That is, a solvent is needed in which both the acid and the lactone are soluble, but with which neither the acid nor the lactone would react. It has been found that suitable solvents for use in the process of this invention are nitroalkanes having the following formula:

$$R - NO_2$$

wherein R is an alkyl radical having from one to four carbon atoms. In a preferred embodiment of this invention, the solvent is selected from the group consisting of nitromethane, nitroethane, 2-nitropropane and mixtures thereof.

The following examples are set forth for the purpose of illustration only and are not intended to be construed as being limitative in any respect.

EXAMPLE I

This example illustrates the preparation of crystalline plicatin from crystalline plicatic acid tetrahydrate employing nitroethane as the solvent.

A solution was prepared by mixing together crystalline plicatic acid tetrahydrate (60 g.), p-toluene sulfonic acid (1.8 g.) and nitroethane (570 ml.) and warming the mixture. This solution was refluxed for 4 hours under a Soxhlet trap containing anhydrous magnesium sulfate. After this time period the magnesium sulfate which had absorbed the water of hydration (8.7 g.) was replaced by "Drierite" (defend, for example, in Kingzett's Chemical Encyclopedia, 7th Edition, Strong, 1946 as being anhydrous calcium sulfate for removing moisture from liquids and gasses) in order to pick up the last traces of water formed during lactonization. Refluxing was continued for an additional 2 hours. The reaction mixture was then rapidly cooled in an ice water bath and 14 g. of primarily unreacted anhydrous plicatic acid precipitated almost immediately in the form of a dark amorphous solid. This amorphous solid was removed by filtration and the essentially colorless mother liquor was stirred overnight to bring about crystallization of colorless plicatin on the sides of the vessel. The plicatin was isolated by filtration and dried under vacuum at 56°C. The dried product was weighed and found to have a weight of 32.2 g. (90 percent yield based on the weight of plicatic acid reacted). The melting point (Leitz hot stage equipment) was found to be 213°-5 C. (with no immediate evidence of decomposition). Recrystallization was conducted for analytical purposes from nitroethane. The recrystallized product was found to have a melting point of 217°-8° C. The product analyzed as follows: 59.45 percent carbon, 5.11 percent hydrogen and 15.2 percent methoxyl; saponification equivalent 401. Pure plicatin $C_{20} H_{20} O_9$ requires: 59.35 percent carbon, 4.98 percent hydrogen, 15.3 percent methoxyl; saponification equivalent 404.4.

The molecular weight of the product by mass spectrometry (at low resolution) was found to be 404. The infrared spectrum in mineral oil showed a strong single peak at 1,780 cm$^{-1}$ indicative of the γ-lactone. The specific optical rotation in water at 589 mμ (Na lamp) was found to be initially $[\alpha]_D^{25} = -128°$ (C, 5, $H_2O$). This value slowly dropped at room temperature due to hydrolysis to plicatic acid whose rotation is $[\alpha]_D^{25} = +4°$ (C, 5, $H_2O$) and was accelerated by mineral acid catalysts.

The crystalline plicatin was found to be only very slightly soluble in water. Also, it was found to be homogeneous and to have $R_f$ values of 0.55 and 0.65 respectively on silica gel plates using benzene: acetone: acetic acid 10:10:1 and n-butanol: acetic acid: water 14:5:2 as solvents (iodine vapor as developer). On paper using water saturated with carbon dioxide as solvent it had an $R_f$ value of 0.71 (Barton's spray reagent containing ferric chloride and potassium ferricyanide which was described in an article by G. N. Barton, R. E. Evans and J. A. F. Gardner in Nature Magazine, Vol. 170, 1952 at page 249 as being a reagent).

EXAMPLE II

This example illustrates the preparation of crystalline plicatin from crystalline plicatic acid tetrahydrate employing 2-nitropropane as the solvent.

A solution was prepared containing crystalline plicatic acid tetrahydrate (10 g.) and p-toluene sulfonic acid (0.8 g.) in 250 ml. of 2-nitropropane solvent. This solution was refluxed under a Soxhlet trap containing "Drierite" (pure anhydrous calcium sulfate). After 75 minutes, the reaction mixture was rapidly cooled in an ice water bath and 3.9 g. of primarily unreacted anhydrous plicatic acid which had precipitated was removed by filtration. The filtrate was then seeded and stirred overnight at room temperature. Thereafter, the filtrate solution was cooled to +5° C. for 30 minutes and a colorless, crystalline plicatin product (4.4 g.) was filtered off. Thin layer chromatography on silica gel plates using n-butanol: acetic acid: water 14:5:2 as solvents (iodine vapor as developer) showed that the crystalline product was plicatin.

EXAMPLE III

This example illustrates the preparation of crystalline plicatin from crystalline plicatic acid tetrahydrate employing nitromethane as the solvent.

A solution was prepared containing crystalline plicatic acid tetrahydrate (1 g.) and p-toluene sulfonic acid (50 mg) in 19 ml. of nitromethane solvent. This solution was gently refluxed under a small Soxhlet trap containing "Drierite" (pure anhydrous calcium sulfate). After 80 minutes, the reaction mixture was then rapidly cooled in an ice water bath and some unreacted anhydrous plicatic acid precipitated. This precipitated plicatic acid was removed by filtration. The filtrate was stirred overnight during which time colorless, crystalline plicatin slowly deposited. Thin layer chromatography on silica gel plates using n-butanol: acetic acid: water 14:5:2 as solvents (iodine vapor as developer) showed that the crystalline product was plicatin.

EXAMPLE IV

This example illustrates the manner in which the anti-oxidant effectiveness of crystalline plicatin is shown by standard tests of this property.

The standard American Oil Chemists Society method for demonstrating anti-oxidant activity of a particular compound is to determine the number of hours it takes for a sample of a given fat or oil containing 0.01 percent by weight of the compound to develop a peroxide value of 100 m.e. per 1,000 grams of the oil or fat. This value of 100 is referred to as the standard of rancidity. The time period which is required for a given sample to reach this standard of rancidity is determined. The more time it takes to reach this value, the more effective is the compound being tested with respect to its anti-oxidant activity.

It is possible by means of this standard American Oil Chemists Society method to show that crystalline plicatin is a very effective anti-oxidant compound.

I claim:

1. A process for preparing pure crystalline plicatin which comprises dissolving crystalline plicatic acid tetrahydrate in an excess of an inert, neutral nitroalkane solvent, to form a solution, said nitroalkane solvent having the following formula:

wherein R is an alkyl radical having from one to four carbon atoms, incorporating in said solution a catalytic amount of an acid catalyst, refluxing said solution under anhydrous conditions, removing the water of lactonization, cooling said solution to ambient temperature or below to crystallize out of said solution colorless crystals of plicatin, and recovering said pure crystalline product.

2. The process of claim 1 wherein said nitroalkane solvent is selected from the group consisting of nitromethane, nitroethane, 2-nitropropane and mixtures thereof.

3. The process of claim 1 wherein said acid catalyst is p-toluene sulfonic acid.

4. A process for producing crystalline plicatin which comprises dissolving crystalline plicatic acid tetrahydrate in an excess of an inert, neutral nitroalkane solvent having the formula

wherein R is an alkyl radical having from one to four carbon atoms, heating the resulting solution under anhydrous conditions, removing the water of lactonization, cooling said solution to crystallize plicatin crystals therefrom, and recovering said crystalline plicatin.

5. The process of claim 4 wherein said inert, neutral solvent is selected from the group consisting of nitromethane, nitroethane, 2-nitropropane and mixtures thereof.

6. The process of claim 4 wherein a catalytic amount of an acid catalyst is incorporated into said solution of plicatic acid and inert, neutral solvent.

7. The process of claim 6 wherein said acid catalyst is p-toluene sulfonic acid.

* * * * *